Jan. 1, 1952   D. L. RICHARDSON   2,580,596
PRESSURE SENSITIVE ENGINE SHUTDOWN DEVICE
Filed Dec. 15, 1949   2 SHEETS—SHEET 1
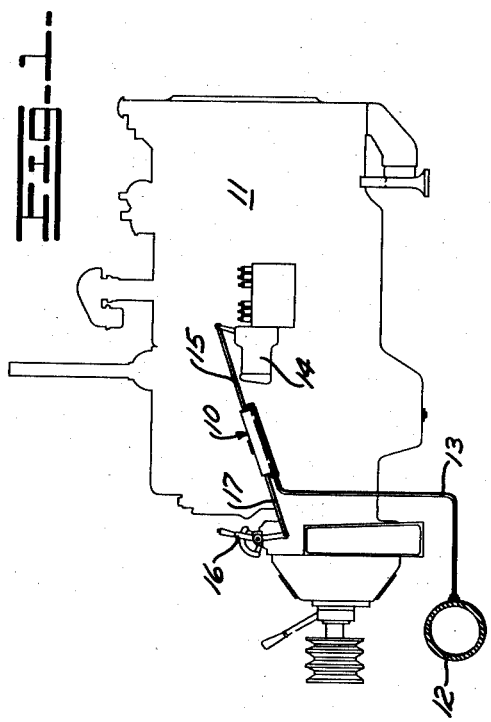
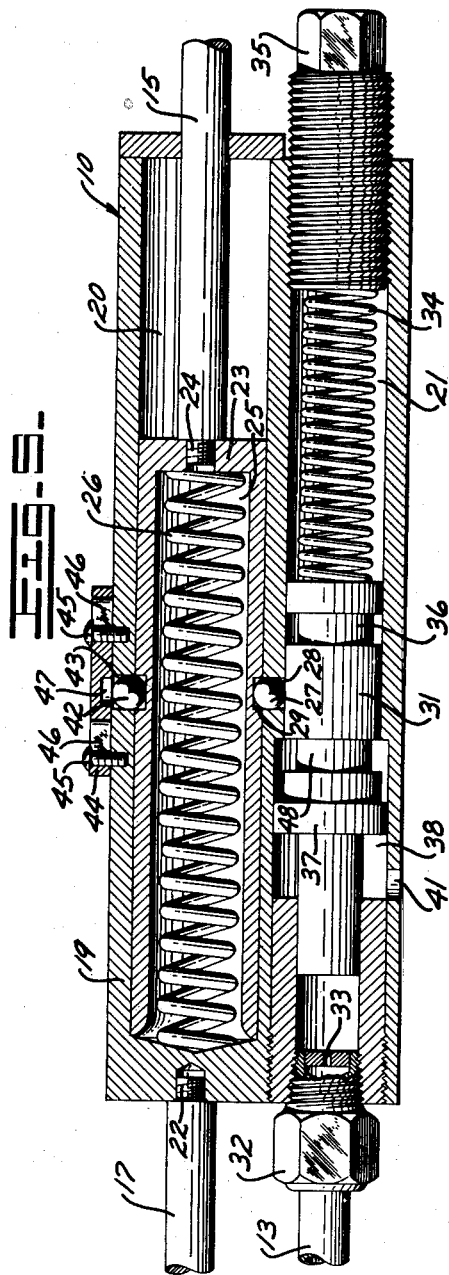
INVENTOR.
Dale L. Richardson
BY Charles M. Fryer
ATTORNEY.

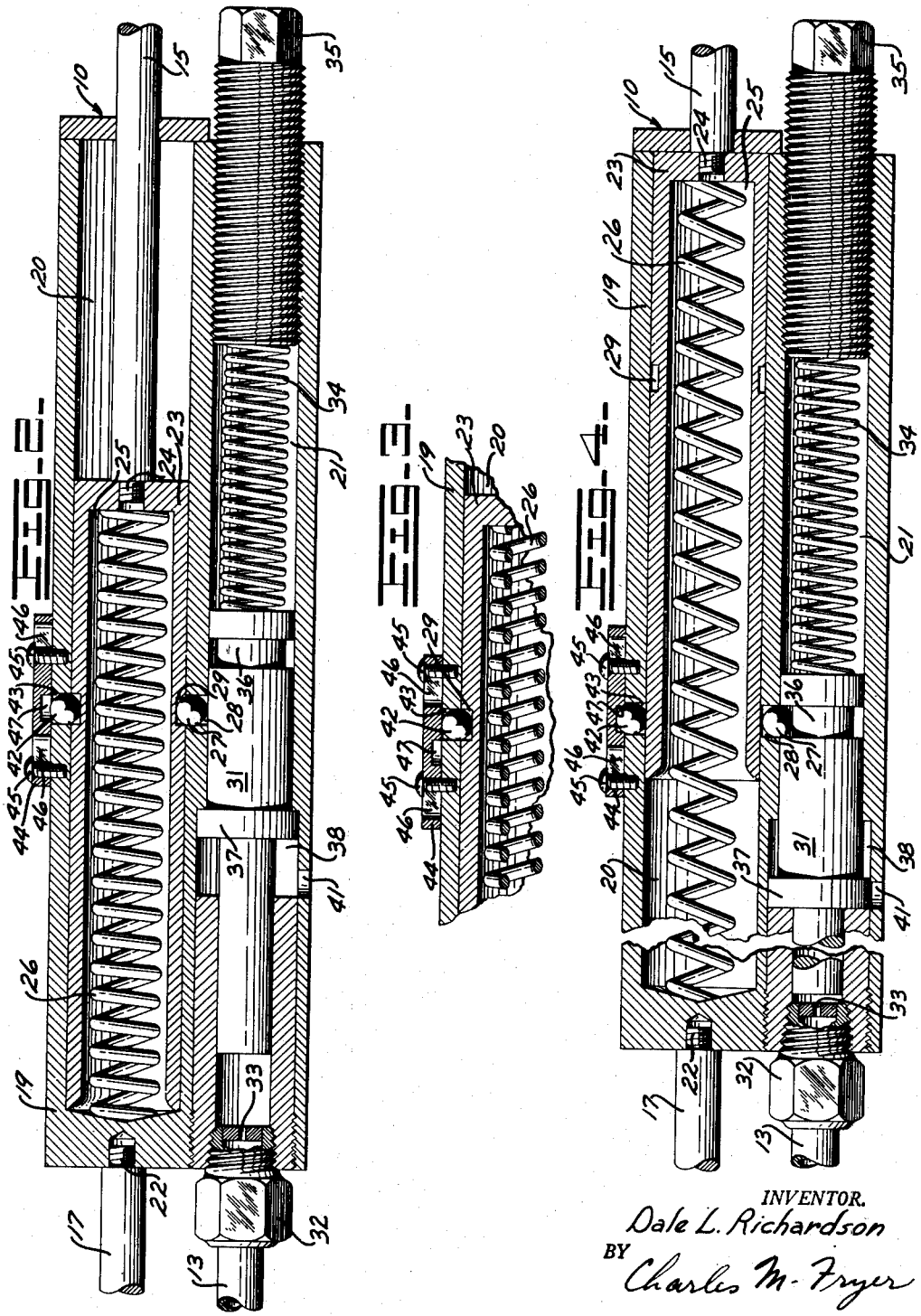

Patented Jan. 1, 1952

2,580,596

UNITED STATES PATENT OFFICE 2,580,596

PRESSURE SENSITIVE ENGINE SHUT-DOWN DEVICE

Dale L. Richardson, Peoria, Ill., assignor to Caterpillar Tractor Co., Peoria, Ill., a corporation of California Application December 15, 1949, Serial No. 133,150

3 Claims. (Cl. 74—2)

The present invention relates to a pressure sensitive engine shut-down device particularly adapted for use in connection with an internal combustion engine driving a fluid pump or the like.

A typical application of the present invention is found in oil pipe line operations in which engine driven fluid pumps are employed as boosters to maintain an operating pressure in the pipe line. These engine driven pumping units are normally located at widely spaced intervals and a single engine attendant is required to operate several units. As a result, once they are started, the engines operate virtually without attention for extended periods of time, thus it is desirable to provide means for shutting down each of the engines automatically in response to pressure conditions in the pipe line. Such a device preferably permits normal operation of the engine until the fluid in the pipe line reaches a pre-determined pressure at which time it quickly and positively shuts off the supply of fuel to the engine and prevents restarting until the device has been reset. It is also desirable that the device be extremely reliable in its operation and that it be a unit assembly to facilitate installation and removal with a minimum of changes to the engine. Although the present invention is illustrated in its association with an engine driving a fluid pump, it will be apparent that it is readily adaptable to other uses, as for example, it may be associated with the engine lubricating system and operate to shut the engine down in response to low oil pressure.

It is an object of the present invention to provide a pressure sensitive engine shut-down device operable to shut the engine down automatically in response to pressure conditions produced by the engine. It is another object of this invention to provide a pressure sensitive engine shut-down device of unusually simple design which may be easily installed on an engine with a minimum of changes thereto. Other objects and advantages of this invention will be made apparent in the following specification wherein reference is made to the accompanying drawings.

In the drawings:

Fig. 1 is a schematic view in side elevation of a pressure sensitive engine shut-down device embodying the present invention in its application to an internal combustion engine adapted to drive a fluid pump;

Fig. 2 is a longitudinal sectional view of the engine shut-down device illustrating the various parts in their positions during normal engine operation;

Fig. 3 is a fragmentary view showing parts of Fig. 2 illustrating the various parts in their position to enable starting of the engine;

Fig. 4 is a view similar to Fig. 2 illustrating the parts in their various positions at engine shut-down; and Fig. 5 is a longitudinal sectional view of a modification of the engine shut-down device illustrated in Figs. 2, 3, and 4.

In Fig. 1, an engine shut-down device embodying the present invention is illustrated generally at 10 in its association with an internal combustion engine 11, of the compression ignition type, adapted to drive a fluid pump (not shown) employed for increasing the pressure of a fluid transmitted through a pipe line, a part of which is illustrated at 12. A flexible tube 13 provides communication between the pipe line and the engine shut-down device which is connected to a constant speed engine governor mechanism 14, controlling the quantity of fuel metered to the engine, by means of a link 15 and to a manually operable throttle control 16 by means of a link 17. During normal operating conditions, the shut-down device provides a solid connection between links 15 and 17, however, when the pressure in the pipe reaches a preset value it is adapted to move the link 15 in a direction to shut off the supply of fuel to the engine.

As is best illustrated in Fig. 2, the pressure sensitive device 10 comprises a casing 19, having a pair of adjacent cylinders 20 and 21 provided therein, and secured as by threaded connection 22 to one end of the link 17 associated with the manual throttle control 16. A piston 23 is disposed for sliding movement in cylinder 20 and is secured as by threads 24 to one end of the link 15 associated with the engine governor 14. Link 15 extends into the cylinder through a suitable opening provided in the casing. The piston 23 is provided with a recess 25 for the reception of a spring 26 urging the piston and link 15 to the right, as viewed in Fig. 2, in a direction to shut off the supply of fuel to the engine. During normal operation of the engine, the piston 23 is adapted to be held in the position illustrated in Fig. 2, compressing the spring 26, by means of a locking mechanism comprising a ball 27 disposed for sliding movement in an aperture 28 providing communication between cylinders 20 and 21. The ball 27 is adapted to be received in an annular recess 29 provided in the periphery of the piston 23 to prevent relative movement between the piston and the casing 19.

The ball 27 is normally held in the recess 29 of piston 23 by engagement with the periphery of a plunger 31 disposed for sliding movement in cylinder 21. Fluid pressure from the pipe line is admitted to one end of cylinder 21 by way of tube 13 which is connected to the casing by means of a threaded fitting 32 having a relatively small orifice 33 opening into the cylinder. Fluid pressure in the cylinder urges the plunger to the right as viewed in Fig. 2 and is opposed by a spring 34 interposed between the plunger and an adjusting screw 35 having a threaded engagement with the inner periphery of cylinder 21 to permit adjustment of the spring force. The periphery of the plunger is provided with an annular recess 36 adapted to receive the ball 27 when the plunger is moved, in response to fluid pressure, to the position illustrated in Fig. 4 in which the recess registers with the aperture 28. In this position, the ball 27 is forced out of recess 29 in piston 23 into recess 36 in plunger 31 releasing piston 23 which is moved to the engine shut-off position by the action of spring 26. The plunger 31 is provided with a raised collar 37 adapted to engage suitably spaced shoulders formed by an enlarged portion 38 of the bore 21 to limit its sliding movement. Fluid leaking past the plunger is vented to the exterior of the casing by an aperture 41 to prevent the formation of a hydraulic lock.

To facilitate resetting the shut-down device, the piston 23 may be held in its normal operating position by a second locking mechanism comprising a ball 42 adapted to engage the recess 29. The ball 42 is disposed for sliding movement in an aperture 43 provided in casing 19 which is adapted to register with recess 29 when the piston is returned to its normal operating position. As is best illustrated in Fig. 3, the ball 42 may be held in engagement with recess 29 preventing movement of the piston by a plate 44 slidably secured to the casing 19 as by cap screws 45 extending through elongated openings 46 provided in the plate. The plate is also provided with a recess 47 adapted to receive the ball 42 permitting sliding movement of the piston upon movement of the plate to the position in which the recess 47 registers with aperture 43. This locking mechanism may also be employed to render the pressure sensitive device inoperative in the event that operating conditions make its use undesirable.

Fig. 5 illustrates a modification of the pressure sensitive device illustrated in Figs. 2, 3 and 4. In this modification, the periphery of plunger 31 is provided with an additional annular recess 48 for the reception of the ball 27, which is spaced from recess 29. The addition of recess 48 makes it possible to shut down the engine automatically when the fluid pressure to be controlled becomes either too high or too low.

I claim:

1. A pressure sensitive engine shut-down device comprising a pair of adjacent cylinders, a spring pressed piston in one cylinder adapted to be associated with engine controls and normally urged to engine shut-down position, a reciprocable plunger in the other cylinder biased in one direction by a spring and in the opposite direction by the pressure to be controlled, said cylinders having an intercommunicating opening, said piston having a recess in its periphery adapted to register with said opening when the piston is held out of its engine shut-down position, a locking member in said opening to prevent movement of the piston, and means on said plunger to release said locking member from its locking position in response to predetermined pressure conditions in its cylinder.

2. A pressure sensitive engine shut-down device comprising a pair of adjacent cylinders, a spring pressed piston in one cylinder adapted to be associated with engine controls and normally urged to engine shut-down position, a reciprocable plunger in the other cylinder biased in one direction by a spring and in the opposite direction by the pressure to be controlled, said cylinders having an intercommunicating opening, said piston having a recess in its periphery adapted to register with said opening when the piston is held out of its engine shut-down position, a locking member in said opening to prevent movement of the piston, said plunger having a recess adapted to register with said opening at a pre-determined pressure in its cylinder, and means to release said locking member from its locking position when said recess in the plunger registers with said opening.

3. A pressure sensitive engine shut-down device comprising a pair of adjacent cylinders, a spring pressed piston in one cylinder adapted to be associated with engine controls and normally urged to engine shut-down position, a reciprocable plunger in the other cylinder biased in one direction by a spring and in the opposite direction by the pressure to be controlled, said cylinders having an intercommunicating opening, said piston having a recess in its periphery adapted to register with said opening when the piston is held out of its engine shut-down position, a locking member in said opening to prevent movement of the piston, means on said plunger to release said locking member from its locking position in response to pre-determined pressure conditions in its cylinder, and means associated with said plunger for adjusting the pressure in its cylinder at which said locking member is released.

DALE L. RICHARDSON.

REFERENCES CITED

The following references are of record in the file of this patent:

UNITED STATES PATENTS

| Number | Name | Date |
| --- | --- | --- |
| 2,207,386 | Trampier | July 9, 1940 |
| 2,236,145 | Kolb | Mar. 25, 1941 |
| 2,423,006 | Chambers et al. | June 24, 1947 |
| 2,481,966 | Zivi | Sept. 13, 1949 |